Patented Aug. 28, 1923.

1,466,240

UNITED STATES PATENT OFFICE.

ELOV FJETTERSTRÖM MAAS, OF LONG BRANCH, NEW JERSEY.

CAR MOUNTING AND CAR-WHEEL ASSEMBLY.

Application filed March 24, 1921. Serial No. 455,264.

*To all whom it may concern:*

Be it known that I, ELOV FJETTERSTRÖM MAAS, citizen of the United States, residing at 6 Arthur Avenue, Long Branch, county of Monmouth, State of New Jersey, have invented certain new and useful Improvements in Car Mountings and Car-Wheel Assemblies, of which the following is a specification.

This invention relates to an improved car mounting and car wheel assembly particularly adapted for use in connection with railroad coaches or trucks.

The object of the invention is to provide an improved car wheel assembly or car mounting for railroad or like coaches or trucks in which the car wheels are rotatably mounted upon the wheel axles and provision is made in a novel manner for lateral movement, that is movement lengthwise of said axles, to enable the car or truck to pass over or negotiate curved portions of the tracks.

The invention comprises an improved car wheel assembly in which the car wheels are supported upon the axle by means of anti-friction bearings, preferably disc roller bearings, so as to be freely rotatable relatively to said axle and are also mounted to have limited movement lengthwise of said axle.

The invention also comprises an improved car mounting in which the car wheels are rotatably mounted on the axles and supporting means are provided between the car frame and axles permitting limited movement therebetween lengthwise of the axles.

Other objects and features of the invention will be clearly understood from the more detailed description of the invention which will now be given.

The invention is illustrated in the accompanying drawings, in which:—

Figure 1:
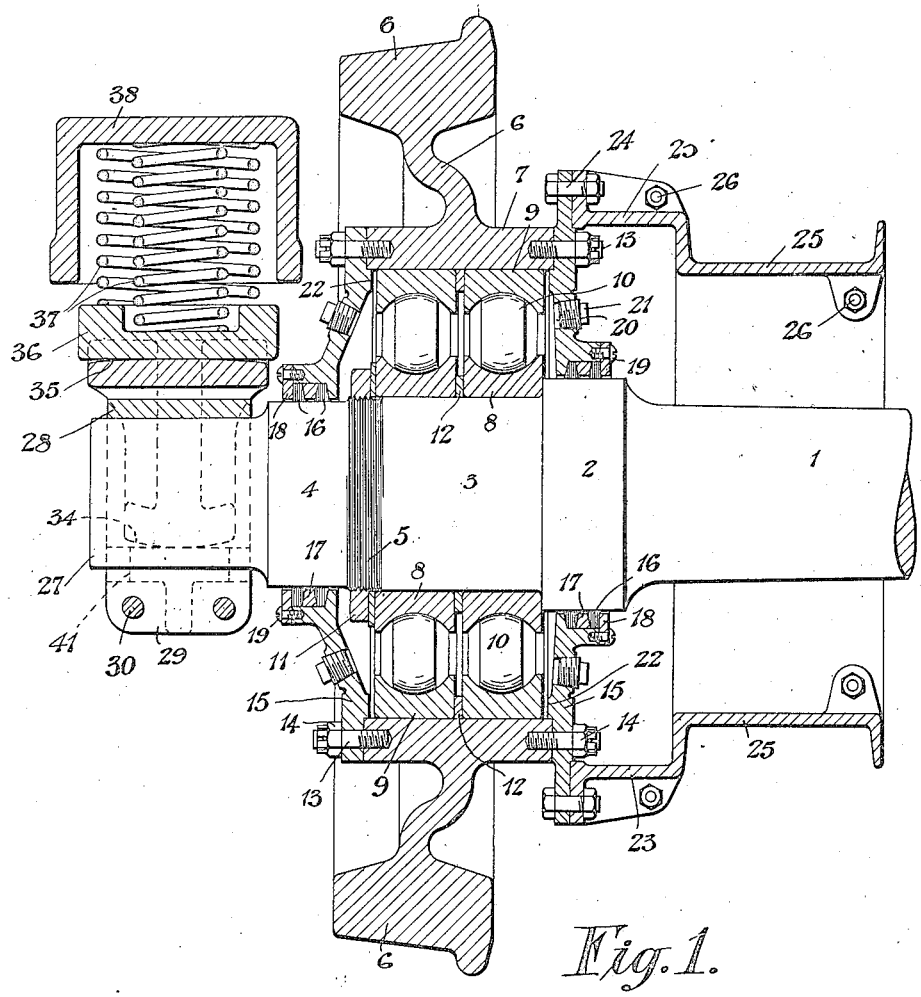
Figure 2:
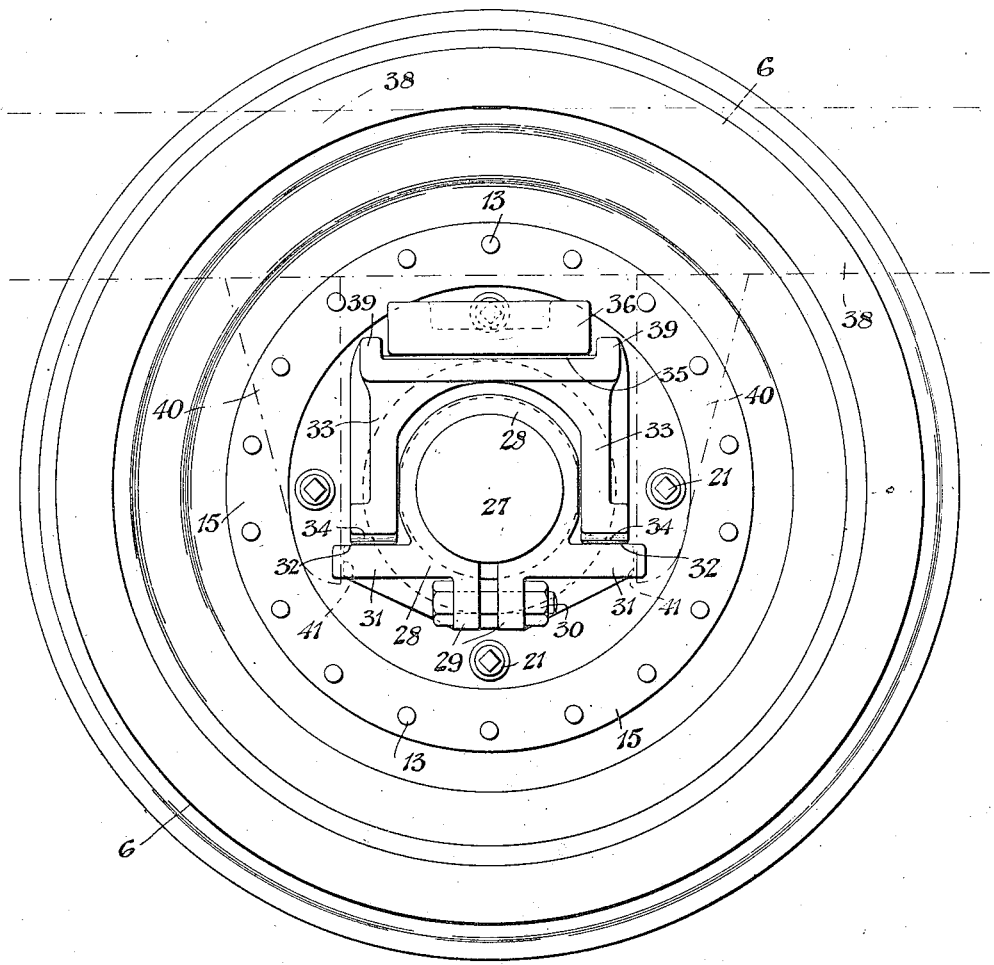

Figure 1 is a sectional view illustrating the manner in which the car wheel is mounted upon the axle and the manner in which the car frame is supported upon said axle; and Figure 2 is an end view, looking at Figure 1 from the left hand end thereof.

Referring in detail to the drawings, it will be noted that the axle which is designated 1 is provided with an enlarged substantially cylindrical portion 2, an intermediate substantially cylindrical portion 3 and a third substantially cylindrical portion 4, the portions 3 and 4 being separated by a screw-threaded portion 5. The car wheel, which is designated 6, is provided with a substantially cylindrical hub portion 7 which is concentric with and surrounds the intermediate portion 3 of the axle, being spaced from said intermediate portion to provide an intermediate annular space adapted to receive anti-friction bearing means.

While it is to be understood that the present invention is not restricted to the use of any particular form of anti-friction bearing means between the axle and the hub portion of the car wheel, I have shown in Figure 1 of the drawings anti-friction bearing means of the type technically known as a disc bearing or disc roller bearing, which is particularly adapted for use in connection with the present invention in view of its ability to carry a thrust load in addition to its radial load. As illustrated, two of these disc bearings are shown arranged side by side within the intermediate annular space between the axle portion 3 and the hub portion 7, each bearing consisting of an inner race member 8 mounted upon the axle portion 3, an outer race member 9 upon which the hub member 7 is mounted and a circular series of disc roller elements 10. The two bearings are installed on the axle portion 3 by the use of a suitable wheel press by which pressure is applied to the inner race members 8, the right hand inner race member 8 being pressed home against the shoulder formed at the junction between the enlarged axle portion 2 and the intermediate axle portion 3, and the bearings are held in place upon the axle portion 3 by means of a suitable nut 11 threaded upon the threaded portion 5 of the axle. If desired spacing rings 12 may be provided between the race members of the two bearings.

The wheel hub 7 is pulled over and mounted upon the outer race members 9 by any suitable means for this purpose but preferably by means of the mounting fixture or device described and claimed in my copending application No. 455,265, filed March 24th, 1921. By means of this mounting fixture or analogous device the wheel hub is mounted upon the outer race members 9 with the ends of said hub projecting beyond the race members, as will be clear from Figure 1.

Secured to the hub portion 7 at opposite ends thereof by means of studs 13 and nuts 14 are cover members 15 which extend between the hub portion and the axle portions 2 and 4 respectively and are provided with packing rings 16, 17, held in place by rings 18 secured to the cover members by means of screws 19. It will be noted that the hub portion 7 and cover members 15 completely enclose the annular space within which the anti-friction bearing means is located so that a supply of lubricant may be introduced into this space to insure ample lubrication of the anti-friction bearing means, the packing rings 16 coacting with the axle portions 2 and 4 preventing any escape of lubricant along the axle from said space. The lubricant may be introduced into the space in question by means of suitable apertures 20 normally closed by threaded plugs 21.

From an inspection of Figure 1 it will be noted that the inner surfaces 22 of the cover members 15 are spaced apart a distance greater than the distance between the outer surfaces of the race members 9 of the anti-friction bearings. This construction is provided in order that the car wheel and hub portion 7 thereof may be permitted a limited movement relatively to the axle portion 3 lengthwise of said axle. This relative lateral movement of the car wheel is limited by the engagement of the surfaces 22 of the cover members with the adjacent surfaces of the race members 9. During this relative movement between the car wheel and axle the packing rings 16 of the cover members slide upon the respective axle portions 2 and 4.

A substantially cylindrical drum 23 is secured by means of bolts 24 to the inner cover member 15, the inner portion of this drum being formed as at 25 to serve as a driving pulley, from which power may be transmitted to drive an electrical dynamo or the like mounted upon the car body or frame. This drum 23 is preferably formed in two parts secured together by means of bolts 26 so that it may be mounted or removed without removing the wheel from the axle.

The axle 1, at the outer end thereof, is provided with a substantially cylindrical extension 27 upon which is mounted a yoke member 28 provided with extensions or ears 29 adapted to receive bolts 30 by means of which the yoke may be securely clamped or locked to the extension 27 of the axle. This yoke member 28 is provided with lateral extensions 31 having substantially plane upper surfaces 32 upon which is supported a rocker member 33 which is of substantially inverted U-shape, shown particularly in Figure 2, so as to straddle the yoke member 28, the lower surfaces 34 of the rocker member being curved, as indicated particularly in Figure 1, so as to permit the rocker member to rock or roll upon the surfaces 32 of the yoke member 28. Supported upon the upper surface 35 of the rocker member 33 is a member 36 which forms the lower seat for the spring 37 upon which the car frame, indicated at 38, is supported in the usual manner. The upper surface 35 of the rocker member is curved, as indicated, oppositely to the curvature of the lower curved surfaces 34 in order to permit the rocking action of the rocker member relatively to the yoke 28 and seat member 36 while the latter moves with the car frame 38. The rocker member is provided with upstanding lugs 39 which prevent or limit forward or rearward movement of the seat member 36 relatively to the axle 1.

By supporting the car frame upon the axle through the medium of the rocker member 33 a relative lateral movement is permitted between the car frame and the axle, the rocker member during this movement rolling or rocking upon the plane surfaces 32 of the yoke extensions 31. The car frame 38 is provided with downwardly extending pedestals or the like 40, Figure 2, which by engagement with recesses 41 in the yoke extensions 31 serve to limit the relative lateral movement between the car frame and axle.

It will be seen that the yoke member 28 being clamped to the axle extension 27 serves to hold the axle 1 against rotation relatively to the car frame, the car wheels 6 freely rotating upon the axle by reason of the anti-friction bearing means therebetween. It may be desirable after the coach or truck to which the car mounting and wheel assembly is applied has run for a certain time with the car axle in one position to rotationally adjust or change the position of the axle in order to insure an even wear of the inner rings of the bearings, such adjustment for example being made when the coach or truck is overhauled after the coach or truck has travelled a predetermined mileage. This rotational adjustment may be effected by releasing the bolts 30 and turning the axle relatively to the yoke member, for example, through about 180°, the bolts then being tightened to clamp or lock the axle in its adjusted position.

It will be understood that the same constructional arrangement is provided at both ends of the axle although for convenience of illustration only one end of the axle has been shown in Figure 1.

What it is desired to secure by Letters Patent is:—

1. A car wheel assembly, comprising an axle, antifriction bearing means secured to said axle against lengthwise movement, and a car wheel surrounding said axle and mounted upon said means to have limited movement relatively thereto lengthwise of said axle.

2. A car wheel assembly, comprising an axle, a disc roller bearing secured to said axle against lengthwise movement, and a car wheel surrounding said axle and mounted upon said disc bearing to have limited movement relatively thereto lengthwise of said axle.

3. A car wheel assembly, comprising an axle, antifriction bearing means secured to said axle against lengthwise movement, a car wheel having a hub portion mounted upon said means, and end members on said hub portion having their inner faces spaced apart a distance greater than the distance between the outer faces of said bearing means.

4. A car wheel assembly, comprising an axle, antifriction bearing means secured to said axle against lengthwise movement, a car wheel having a hub portion mounted upon said bearing means, and end cover members secured to said hub portion and extending between the same and said axle and having their inner faces spaced apart a distance greater than the distance between the outer faces of said bearing means.

5. A car wheel assembly, comprising an axle, antifriction bearing means secured to said axle against lengthwise movement, a car wheel having a hub portion mounted upon said bearing means, end cover members secured to said hub portion and extending between the same and said axle and having their inner faces spaced apart a distance greater than the distance between the outer faces of said bearing means, and packing means carried by said cover members between the same and said axle.

6. A car wheel assembly, comprising an axle, antifriction bearing means upon said axle consisting of an inner race member secured to said axle, an outer race member and anti-friction roller elements between said members, and a car wheel having a hub portion mounted upon the outer race member to have limited movement relatively thereto lengthwise of said axle.

7. A car wheel assembly, comprising an axle, antifriction bearing means on said axle consisting of a plurality of inner race members secured to said axle side by side, a corresponding number of outer race members, and a series of anti-friction roller elements between each inner race member and the corresponding outer race member, and a car wheel having a hub portion mounted upon said outer race members to have a limited movement relatively thereto lengthwise of said axle.

8. A car wheel assembly, comprising an axle, anti-friction bearing means on said axle consisting of a plurality of inner race members secured to said axle side by side, a corresponding number of outer race members, and a series of anti-friction roller elements between each inner race member and the corresponding outer race member, a car wheel having a hub portion mounted upon the outer race members, and end cover members secured to said hub portion and extending between the same and said axle and having the inner faces thereof spaced apart a distance greater than the distance between the outer faces of said outer race members.

9. A car wheel assembly, comprising an axle, anti-friction bearing means secured to said axle at each end thereof against lengthwise movement, and car wheels surrounding said axle and mounted upon said anti-friction bearing means, each wheel having limited movement relatively to the corresponding bearing means lengthwise of said axle.

10. A car mounting, comprising an axle, car wheels mounted thereon, a member secured to the axle at each end thereof, a car frame or body, and supporting means at each side of said frame resting upon said member at opposite sides of said axle for holding said member and axle against rotation relatively to said frame.

11. A car mounting, comprising an axle, car wheels mounted thereon, a member mounted on the axle at each end thereof, a car frame or body, and supporting means at each side of said frame resting upon said member at opposite sides of said axle, and means for locking said member on the axle to hold the same against rotation in different positions of rotational adjustment relatively to the car frame.

12. A car mounting, comprising an axle, car wheels mounted thereon, a car frame or body, and supporting means between said axle and said frame including a non-rotatable yoke and means for clamping the axle to said yoke to prevent rotation of said axle relatively to said yoke.

13. A car mounting, comprising an axle, car wheels rotatably mounted thereon, a car frame or body, and supporting means between said axle and said frame permitting a limited relative movement therebetween lengthwise of said axle.

14. A car mounting, comprising a non-rotatable axle, car wheels rotatably mounted thereon, a car frame or body, and supporting means between said axle and said frame including a member fixed to the axle and a second member supported upon the first member and movable with the car frame relatively thereto lengthwise of the axle.

15. A car mounting, comprising a non-rotatable axle, car wheels rotatably mounted thereon, a car frame or body, and supporting means between said axle and said frame including an element fixed on the axle, and an element having a limited rolling movement on the first element permitting limited relative movement between the frame and axle lengthwise of the latter.

16. A car mounting, comprising a non-rotatable axle, car wheels rotatably mounted thereon, a car frame or body, and supporting means between said axle and said frame including a member fixed to said axle, and holding the same against rotation, a second member connected with the car frame, and a rocking member supported upon the first member and supporting the second member and capable of a rolling movement relatively to both of said members.

17. A car mounting, comprising an axle, car wheels mounted thereon, a car frame or body, and supporting means between said axle and said frame including a member on the axle having plane supporting surfaces, a second member connected with the car frame, and a rocking member having upper and lower curved surfaces, the latter resting upon the plane surfaces of the first member and the second member being supported upon the upper curved surface of said rocking member.

18. A car mounting, comprising an axle, car wheels rotatably mounted thereon, a car frame or body, supporting means between said axle and said frame permitting a limited relative movement therebetween lengthwise of said axle, and means for limiting said relative movement.

19. A car mounting, comprising an axle, car wheels mounted thereon, a car frame or body, and supporting means between said axle and said frame including a member fixed to the axle and having recesses, a second member supported on the first member and movable with the car frame relatively thereto, and means on said car frame coacting with said recesses to limit said relative movement.

20. A car mounting, comprising an axle, car wheels surrounding the same and at least one of which is mounted to have limited movement lengthwise of and relatively to said axle, anti-friction bearing means between said axle and the wheel hubs, a car frame or body, and supporting means between said axle and said frame permitting a limited relative movement therebetween lengthwise of said axle.

21. A car mounting, comprising an axle, anti-friction bearing means secured to said axle at each end thereof, car wheels surrounding said axle and mounted upon said bearing means, said wheels having limited movement relatively to said bearing means lengthwise of said axle, a car frame or body, and supporting means between said axle and said frame permitting a limited relative movement therebetween lengthwise of said axle.

22. A car mounting, comprising an axle, car wheels surrounding the same and mounted to have limited movement lengthwise of and relatively to said axle, anti-friction bearing means between said axle and the wheel hubs, a car frame or body, and supporting means between said axle and frame including a rocking member permitting a limited relative movement between said axle and frame lengthwise of the axle.

23. A car mounting, comprising an axle, car wheels surrounding the same and mounted to have limited movement lengthwise of and relatively to said axle, means for limiting said relative movement, anti-friction bearing means between the axle and the wheel hubs, a car frame or body, supporting means between said axle and frame permitting a limited relative movement therebetween lengthwise of said axle, and means for limiting said relative movement.

In testimony whereof I affix my signature in presence of two witnesses.

ELOV FJETTERSTRÖM MAAS.

Witnesses:
 CHELSEA B. BENTON,
 JAMES ARMOUR.